(12) United States Patent
Gupta (10) Patent No.: US 11,734,665 B2
(45) Date of Patent: Aug. 22, 2023

(54) CARD-TO-SMARTGLASSES PAYMENT SYSTEMS

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 145 days.

(21) Appl. No.: 17/169,721

(22) Filed: Feb. 8, 2021

(65) Prior Publication Data

US 2022/0253824 A1 Aug. 11, 2022

(51) Int. Cl.
| | |
|---|---|
| *G06Q 20/00* | (2012.01) |
| *G06Q 20/32* | (2012.01) |
| *G06Q 20/40* | (2012.01) |
| *G06F 3/01* | (2006.01) |
| *G06Q 20/34* | (2012.01) |

(52) U.S. Cl.
CPC ........... *G06Q 20/321* (2020.05); *G06F 3/017* (2013.01); *G06Q 20/325* (2013.01); *G06Q 20/3567* (2013.01); *G06Q 20/4012* (2013.01)

(58) Field of Classification Search
CPC .................................................. G06Q 20/321
USPC ........................................................... 705/44
See application file for complete search history.

(56) References Cited

U.S. PATENT DOCUMENTS

| | | | |
|---|---|---|---|
| 7,967,193 | B1 | 6/2011 | McGinley et al. |
| 9,870,716 | B1 | 1/2018 | Rao et al. |
| 11,308,474 | B1 | 4/2022 | Gupta |

(Continued)

FOREIGN PATENT DOCUMENTS

| | | |
|---|---|---|
| WO | WO2015/127225 | 8/2015 |
| WO | WO2016/105892 | 6/2016 |

(Continued)

OTHER PUBLICATIONS

A Survey of Wearable Devices and Challenges Published in: IEEE Communications Surveys & Tutorials (vol. 19, Issue: 4, pp. 2573-2620) Authors: Suranga Seneviratne et al (Year: 2017).*

(Continued)

*Primary Examiner* — Bruce I Ebersman
*Assistant Examiner* — John A Anderson
(74) *Attorney, Agent, or Firm* — Weiss & Arons LLP (57) ABSTRACT

Methods and apparatus for card-to-smartglasses payment systems are provided. A smartglasses device may scan a payment card using a camera. The smartglasses device may identify card data elements from the payment card. The smartglasses device may initiate a transaction. The transaction may include the following components: a payer, a payee and a transaction amount. The payment card may be associated with the payer component of the transaction. As such, the card data elements may be included as the payer component of the transaction. The smartglasses may receive data from a third-party relating to the payee component of the transaction. The transaction amount may be inputted into the smartglasses as user input. The generated transaction may be transmitted to an entity for processing. Upon processing completion, the entity may transmit a notification to the smartglasses, to a device associated with the payment card and to a device associated with the payee.

15 Claims, 6 Drawing Sheets

(56) References Cited

U.S. PATENT DOCUMENTS

| | | | |
|---|---|---|---|
| 11,354,631 | B1 | 6/2022 | Hill et al. |
| 11,354,632 | B1 | 6/2022 | Hill et al. |
| 11,386,424 | B2 | 7/2022 | Dicker et al. |
| 11,436,581 | B1 | 9/2022 | Walker et al. |
| 2012/0310835 | A1 | 12/2012 | Adams et al. |
| 2014/0146178 | A1 | 5/2014 | Kim et al. |
| 2014/0349692 | A1 | 11/2014 | Zhou et al. |
| 2014/0368336 | A1 | 12/2014 | Felix |
| 2015/0073907 | A1* | 3/2015 | Purves .......... G06Q 20/384 705/14.58 |
| 2015/0081539 | A1 | 3/2015 | Mizuno et al. |
| 2015/0178532 | A1 | 6/2015 | Brule |
| 2015/0206045 | A1 | 7/2015 | Gazdzinski |
| 2015/0229750 | A1 | 8/2015 | Zhou et al. |
| 2015/0310412 | A1 | 10/2015 | Calderon et al. |
| 2015/0324181 | A1* | 11/2015 | Segal .......... H04W 52/0264 709/217 |
| 2015/0339696 | A1 | 11/2015 | Zhou et al. |
| 2016/0034887 | A1 | 2/2016 | Lee |
| 2016/0109954 | A1* | 4/2016 | Harris .......... G06V 20/20 345/156 |
| 2016/0142866 | A1 | 5/2016 | Jang et al. |
| 2016/0171487 | A1 | 6/2016 | Deliwala et al. |
| 2016/0178905 | A1* | 6/2016 | Rider .......... G06F 3/167 345/8 |
| 2016/0275483 | A1 | 9/2016 | Zhou |
| 2016/0321742 | A1 | 11/2016 | Phillips et al. |
| 2016/0364008 | A1* | 12/2016 | Chun .......... G02B 27/01 |
| 2016/0379205 | A1 | 12/2016 | Margadoudakis |
| 2017/0004485 | A1 | 1/2017 | Lee et al. |
| 2017/0076284 | A1 | 3/2017 | Wu et al. |
| 2017/0103440 | A1 | 4/2017 | Xing et al. |
| 2017/0116657 | A1* | 4/2017 | Oh .......... G06Q 30/0207 |
| 2017/0161720 | A1 | 6/2017 | Xing et al. |
| 2017/0293740 | A1 | 10/2017 | Xing |
| 2017/0323285 | A1 | 11/2017 | Xing |
| 2018/0329209 | A1* | 11/2018 | Nattukallingal ....... G02B 27/01 |
| 2019/0033622 | A1 | 1/2019 | Olgun et al. |
| 2019/0053739 | A1 | 2/2019 | Inoue et al. |
| 2019/0075266 | A1* | 3/2019 | Jeong .......... H04N 21/4438 |
| 2019/0279195 | A1 | 9/2019 | Li |
| 2019/0286805 | A1 | 9/2019 | Law et al. |
| 2019/0298173 | A1 | 10/2019 | Lawrence et al. |
| 2019/0377417 | A1 | 12/2019 | Friedman et al. |
| 2020/0202313 | A1* | 6/2020 | Eidam .......... A61B 5/117 |
| 2020/0350989 | A1 | 11/2020 | Llewelyn |
| 2021/0058758 | A1 | 2/2021 | Carter et al. |
| 2021/0241256 | A1 | 8/2021 | Caldwell |
| 2021/0279700 | A1 | 9/2021 | Simpson et al. |
| 2021/0357897 | A1 | 11/2021 | Phillips et al. |
| 2022/0083985 | A1 | 3/2022 | Negulescu et al. |
| 2022/0114327 | A1 | 4/2022 | Faaborg et al. |
| 2022/0237584 | A1 | 7/2022 | Gupta |

FOREIGN PATENT DOCUMENTS

| | | |
|---|---|---|
| WO | WO2018/083663 | 5/2018 |
| WO | WO2019/003074 | 1/2019 |
| WO | WO2020/053706 | 3/2020 |

OTHER PUBLICATIONS

Research on E-Payment Model Published in: 2010 International Conference on E-Business and E-Government (pp. 339-341) Authors: Zhu Junxuan (Year: 2010).*
Max Freeman-Mills, "Apple AR Glasses Could Land in 2022—According to New Report," https://www.wareable.com/ar/apple-augmented-reality-ar-smartglasses-3501, Wareable Ltd., Nov. 12, 2019.
"Bluetooth," https://en.wikipedia.org/wiki/Bluetooth, Wikimedia Foundation, Inc., Oct. 14, 2020.
"Connectivity," https://developers.google.com/glass-enterprise/guides/connectivity, Google Developers, Glass Enterprise Edition 2, Jul. 27, 2020.
"Design Guidelines," https://developers.google.com/glass-enterprise/guides/design-guidelines, Glass Enterprise Edition 2, Google Developers, May 21, 2019.
"Development Tips," https://developers.google.com/glass-enterprise/guides/development-tips, Glass Enterprise Edition 2, Google Developers, Aug. 12, 2020.
"Get Started," https://developers.google.com/glass-enterprise/guides/get-started, Glass Enterprise Edition 2, Google Developers, Aug. 12, 2020.
"Inputs and Sensors," https://developers.google.com/glass-enterprise/guides/inputs-sensors, Google Developers, Glass Enterprise Edition 2, Jul. 29, 2020.
"Smartglasses," https://en.wikipedia.org/wiki/Smartglasses, Wikimedia Foundation, Inc., Oct. 1, 2020.
"Tech Specs," https://www.google.com/glass/tech-specs/, Glass Enterprise Edition 2, Retrieved on Oct. 19, 2020.
Michael Sawh, "The Best AR Glasses and Smartglasses 2020: Snap, Vuzix and More," https://www.wareable.com/ar/the-best-smartglasses-google-has-and-the-rest, Wareable Ltd., Jul. 1, 2020.
"User Interface," https://developers.google.com/glass-enterprise/guides/user-interface, Google Developers, Glass Enterprise Edition 2, Feb. 27, 2020.
"Vue Lite Cygnus," https://vueglasses.com/collections/eyeglasses-vue-life-cygnus-eyeglasses?variant=35797226291363, Vigo Technologies Inc., Retrieved on Oct. 19, 2020.
"Vue: Your Everyday Smart Glasses," https://www.kickstarter.com/projects/vue/vue-your-everyday-smart-glasses, Kickstarter, PBC, Retrieved on Oct. 19, 2020.
"Nano-Thin Flexible Touchscreens Could Be Printed Like Newspaper," https://www.sciencedaily.com/releases/2020/01/200124112927.htm, Science Daily, Jan. 24, 2020.
"Network Interface Controller," https://en.wikipedia.org/wiki/Network_interface_controller, Wikimedia Foundation, Inc., Jan. 11, 2021.
"Network Interface Card (NIC)," https://searchnetworking.techtarget.com/definition/network-interface-card, TechTarget, Retrieved on Feb. 4, 2021.
Chengcheng Huang, "Wearable Computers: State of the Art and Future Challenges," https://www.theseus.fi/bitstream/handle/10024/96907/HUANG_CHENGCHENG.pdf?sequence=1&isAllowed=y, May 2015.
Krysztof Jackowski, "Augmented Reality on Mobile with an App Tutorial for Android," Nov. 6, 2019.

* cited by examiner

CARD-TO-SMARTGLASSES PAYMENT SYSTEMS

FIELD OF TECHNOLOGY

Aspects of the disclosure relate to smartglasses. Specifically, this disclosure relates to smartglasses communications.

BACKGROUND OF THE DISCLOSURE

Smartglasses have become more common in recent years. For the purposes of this disclosure, smartglasses may be understood to mean wearable glasses that include one or more internal processors.

Smartglasses are compact devices and usually stay with the user. Therefore, smartglasses are easily accessible. Because of the ease of access associated with smartglasses, it would be desirable for a smartglasses to communicate with a payment card. Such a payment card may include a debit card, credit card, automated teller machine ("ATM") card or any other suitable card.

It would be further desirable for the smartglasses to communicate with an entity, such as a financial institution.

It would be yet further desirable for the smartglasses to act as a liaison between the payment card and the financial institution.

It would be still further desirable for such communication to obviate the need for associated mobile devices, desktop computers, laptop computers or any other devices.

It would be still yet further desirable for the smartglasses to operate as a card reader.

SUMMARY OF THE DISCLOSURE

Apparatus and methods for card-to-smartglasses transactions are provided. For the purposes of this disclosure, smartglasses may be understood to mean wearable glasses that include one or more internal processors. The one or more internal processors may include one or more microprocessors.

In addition to the processors, smartglasses may also include hardware components associated with conventional glasses. Such conventional components may include a frame and lenses.

Other hardware components of smartglasses may include one or more displays, one or more cameras for capturing photographs and/or videos, one or more audio input devices, one or more audio output devices, one or more communication transceivers, one or more wired and/or wireless communication modules (e.g., Bluetooth®, Beacon®) and/or any other suitable hardware components.

The smartglasses display may display data as instructed by the microprocessor. In one embodiment, the smartglasses display may be physically configured to add data alongside what the wearer sees through the lenses. In some embodiments, the smartglasses display may display data as an at least partially transparent overlay on top the lenses. As such, the user may view, through the overlay, the physical objects that are normally seen through lenses. Such a smartglasses display may be known as an augmented realty smartglasses display.

One or more software modules may execute on the processors. The one or more software modules may be stored in a memory located within the smartglasses. The one or more software modules may, in the alternative, be referred to as applications. The applications may enable the smartglasses to execute various tasks.

Another component of smartglasses may include the ability for smartglasses to modify its optical properties, such as tint and prescription of the lenses. The optical properties modification may be executed at any given time. Smartglasses may change optical properties of the lenses by executing one or more software modules on the internal processors.

Smartglasses may also include one or more communication transceivers. The communication transceivers may be operable to communicate with external processors. The external processors may be included in a mobile device or any other suitable computing device.

The smartglasses device may include a contactless communication module. The contactless communication module may operate on the smartglasses processor. The contactless communication module may initiate communication with another smartglasses. In some embodiments, the contactless communication module may be an active near field communication ("NFC") reader. As such, the contactless communication module may communicate with another smartglasses using NFC technology.

A smartglasses may be utilized to initiate a transaction. The transaction may be a payment-card-based transaction. The smartglasses may retrieve card data. The smartglasses may retrieve payee data. The smartglasses may retrieve transaction amount data. The smartglasses may combine the card data and the payee data into a transaction payload. The smartglasses may communicate the transaction payload to a financial institution for processing.

The smartglasses camera or group of cameras may operate as a scanning component. The scanning component, included in the smartglasses device, may scan a card. The card may be a payment card. The payment card may be a debit card, credit card, automated teller machine ("ATM") card or any other suitable card. The payment card may or may not include an electronic chip. The scanning component may generate a card scan. A card scan may include a photograph of the card. The card scan may include a photograph of the face of the card. The card scan may include a photograph of the underside of the card.

The smartglasses processor may execute a software application that identifies and retrieves card data elements from the card scan. Such an application may be referred to as a card data identification component. The card data identification component may retrieve a plurality of card data elements from the scan of the card. The card data elements may include a card number, a card holder name, an expiration date and a card verification value ("CVV") code. These card data elements may also include identification of an external entity, such as a financial institution, associated with the card. These card data elements may include any other suitable card data elements.

In some embodiments, the scanning component and the card data identification component may execute concurrently. As such, the scanning component may scan the card data elements from the card without maintaining a card scan.

The smartglasses may retrieve a plurality of payee data elements. The plurality of payee data elements may include a payee name, payee account number, payee financial institution, payee telephone number, payee e-mail address and any other suitable payee information.

In some embodiments, the smartglasses user may be associated with the payee account. As such, the payee data elements may include an account associated with the smartglasses device.

In certain embodiments, the payee data elements may be retrieved from a source external to the smartglasses. Such an external source may include a merchant point-of-sale device.

In yet other embodiments, the payee data elements may be retrieved from a source internal to the smartglasses. Such an internal source may include a memory located within the smartglasses.

In still other embodiments, the payee data elements may be inputted as user input into the smartglasses. For example, a payee account number or telephone number may be entered into the smartglasses using a smartglasses touch screen.

In some embodiments, a payee telephone number and/or e-mail address may not be considered payee data elements. Rather, a payee telephone number and/or e-mail address may be considered a payee alias. As such, the payee telephone number and/or payee e-mail address may be entered into the smartglasses as user input. The smartglasses may communicate the payee telephone number or payee e-mail address to a financial institution. The financial institution may respond to the smartglasses with the payee data elements. The received payee data elements may be included in the transaction.

The smartglasses may initiate a transaction by transmitting a plurality of card data elements and the plurality of payee data elements to an entity. The entity may be a financial institution. The entity may be a financial institution identified within the plurality of card data elements. The entity may be a financial institution identified within the plurality of payee data elements.

In some embodiments, the smartglasses may also capture a transaction amount and/or personal identification number ("PIN") at the smartglasses. The transaction amount may be a dollar amount of the requested transaction. The PIN may be an identification number associated with the payment card. The transaction amount and/or PIN may be transmitted to the entity together with the plurality of card data elements and plurality of payee data elements.

The entity may process the transaction. The entity may transmit a transaction confirmation to the smartglasses. The transaction confirmation may include details relating to the transaction. Such details may include a transaction amount, a timestamp of the transaction, a portion of the digits of the card, a portion of the digits of an account associated with the payee, an alias associated with the payee, an alias associated with the card and/or any other suitable transaction details.

The entity may also transmit the transaction confirmation to a device identified within the plurality of card data elements. Such a device may be associated with the card. Such a device may be the card itself.

The transaction amount, PIN and/or any other suitable user input may be received at the smartglasses, from a user, in a variety of ways. For example, the user input may be received from the user via touch gestures to one or more dynamic and/or static buttons on the smartglasses. The user input may also be received at, and/or sensed by, a nano touch screen included in the smartglasses. The nano touch screen may be a nano light emitting diode ("LED") touch screen. The nano touch screen may be a nano organic light emitting diode ("OLED") touch screen. The nano OLED touch screen may be constructed using OLED technology.

OLED technology may enhance functionality of a smartglasses display. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing nodes that consume less power for their basic functionality and allow any residual power to provide enhanced security and functionality. Illustrative devices that may be constructed using OLED technology are disclosed in commonly assigned U.S. Pat. No. 9,665,818, which is hereby incorporated by reference herein in its entirety.

In some embodiments, the nano touch screen may be constructed, using liquid metal printing, from atomically-thin indium-tin oxide ("ITO"). During construction, an indium-tin alloy is heated to 200 degrees Celsius. At 200 degrees Celsius, the indium-tin alloy becomes a liquid. The liquid is then rolled over a surface to print nano-thin sheets of ITO. These nano sheets are two-dimensional and have the same chemical make-up as standard ITO. However, these nano sheets have a different crystal structure than standard ITO. The new crystal structure gives the nano sheets new mechanical and optical properties.

One new property may include the full flexibility of the ITO sheets. These ITO sheets also absorb approximately 0.7% of light, which is lower than standard conductive glass that absorbs 5-10% of light. These ITO sheets may also be transparent. As such, these nano ITO sheets provide fully flexible, conductive and transparent material. Therefore, such atomically-thin ITO sheets may be used to produce nano touch screens for inclusion in smartglasses. The ITO may be wrapped around a portion of the lenses and/or frames of the smartglasses.

The nano LED touch screen may receive touch-based user input, also referred to herein as touch gestures. It should be appreciated that the touch gestures may be accepted at one or more portions of the frames and/or lenses of the smartglasses. As such, the nano LED touch screen may cover a portion of the frames and/or lenses of the smartglasses. Touch gestures may include swiping, tapping, squeezing and any other suitable touch gestures. Touch gestures may also include a pattern of any of the above-mentioned gestures.

The user input may also be received from air-based hand and/or body gestures. Air-based hand and/or body gestures may be performed by the user's hand and/or body without specifically touching the smartglasses.

Various sensors may be included in the smartglasses. These sensors may include the nano LED touch screen, the camera(s), an accelerometer, a gyroscope and any other suitable sensors. These sensors may sense the touch gestures, hand gestures and/or air gestures.

Upon sensing the touch gestures, hand gestures and/or air gestures, the sensor(s) and/or associated processors may translate the touch gestures, hand gestures and/or air gestures into user input. The user input may be based on a user input structure. The user input structure may be a digital alphanumerical pad. In some embodiments, the user input structure may be received from an external processor.

In some embodiments, the smartglasses device may authenticate the user before, during and/or after the transaction initiation and/or transaction generation. An authorization module, included in the smartglasses device, may authenticate the user of the smartglasses. The authentication may be executed at an authorization module included in the smartglasses device. The authorization module may authenticate the user based on a group of detected user behavioral characteristics. The group of detected user behavioral characteristics may include gait, speed, voice detection, head movements and body movements. The authorization module may authenticate the user using any suitable authentication method.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus and methods for card-to-smartglasses payment systems are provided.

A smartglasses device may include a plurality of hardware components. The smartglasses device may also include a plurality of software components.

The hardware components may include a glasses frame. The glasses frame may enable the smartglasses to rest on a wearer's face. The hardware components may also include glasses lenses. The glasses lenses may correct the vision of the wearer.

The hardware components may include a processor. The processor may be a microprocessor. The microprocessor may provide processing capabilities to the plurality of hardware components and the plurality of software components within the smartglasses.

The hardware components may also include a nano touch screen. The nano touch screen may display a plurality of software displays as instructed by the microprocessor. The nano touch screen may also receive user input.

The hardware components may also include a scanner. The scanner may include one or more cameras. The scanner may capture one or more card photographs. The one or more card photographs may relate to a payment card. The payment card may be a debit card, automated teller machine ("ATM") card, credit card or any other suitable card. The one or more card photographs may relate to a plurality of payment cards.

The hardware components may also include a nano wireless network interface card ("NIC"). A nano wireless NIC may be a circuit board and/or a chip, installed within the smartglasses, that enables the smartglasses to establish communication with a wireless network. The nano wireless NIC may support input/output ("I/O"), interrupt, direct memory access, interfaces, data transmission, network traffic engineering and/or partitioning.

The nano wireless NIC may provide the smartglasses with a dedicated, full-time connection to a wireless network. The nano wireless NIC may provide the connection by implementing the physical layer circuitry necessary for communicating with a data link layer standard, such as Wi-Fi.

The nano wireless NIC may operate as an intermediary between the smartglasses and a wireless network. For example, the processor may transmit a request to the nano wireless NIC. The nano wireless NIC may convert the request into electrical impulses. The electrical impulses may be transmitted to a web server. The web server may respond to the nano wireless NIC with additional electrical signals. The nano wireless NIC receives the additional electrical signals. The nano wireless NIC translates the additional electrical signals into data that is consumable by the microprocessor.

The hardware components may also include a battery. The battery may power the microprocessor, the nano touch screen, the scanner and/or the nano wireless NIC.

The plurality of software components may include a card data identification module. The card data identification module may identify a plurality of card data elements from the one or more captured card photographs. The plurality of card data elements may relate to the payment card(s).

The software components may also include a payee data identification module. The payee data identification module may identify a plurality of payee data elements. The payee data identification module may be instantiated upon conclusion of the card data identification.

The software components may also include an information controller module. The information controller module may capture a transaction amount and a PIN via the nano touch screen.

The software components may also include a network controller module. The network controller module may interface between the nano wireless NIC and an external Wi-Fi device to provide wireless connectivity to the smartglasses device.

The software components may also include a payment interface. The payment interface may receive wireless connectivity via the network controller module. The payment interface may receive processing capabilities from the microprocessor. The payment interface may receive the plurality of card data elements from the card data identification module. The payment interface may receive the plurality of payee data elements from the payee data identification module. The payment interface may receive the transaction amount and PIN from the information controller module.

In the event that the payee data elements do not include a payee account number, the payment interface may communicate the payee data elements to an external entity to request a payee account number. The payee data elements may include a payee telephone number, payee e-mail address or any other suitable payee data elements.

The payment interface may receive a payee account number from the external entity. Upon receipt of the payee account number from the external entity, the payment interface may generate a transaction record. The transaction record may include the card data elements, the transaction amount, the PIN and the payee account number.

The payment interface may transmit the transaction record to the external entity. The payment interface may receive a transaction confirmation from the external entity.

In some embodiments, multiple cards may be scanned and utilized for a single transaction. In such embodiments, the information controller module may capture a transaction amount and PIN for each of the plurality of payment cards. Also, in such embodiments, the software components may include a card data aggregation and validation module. The card data aggregation and validation module may link the transaction amount and the PIN to the card data elements for each card included in the plurality of payment cards.

The card data aggregation and validation module may, for each card, transmit the transaction amount and the PIN to an external card entity associated with the card. The external card entity may be identified within the plurality of card data elements. The external card entity may also validate each transaction amount and PIN with the external card entity for each card. As such, the card data aggregation and validation module may for each card, authorize the transaction amount and the PIN with the card's respective financial institution prior to generating a transaction payload.

Each external entity may transmit a validation and/or authorization communication to the card data aggregation and validation module. Upon receipt of validation and/or authorization from each of the external card entities, the card data aggregation and validation module may aggregate each of the plurality of card data elements, linked to the transaction amount and PIN, into an aggregated transaction payload.

In such embodiments, the payment interface may receive the aggregated transaction payload. The payment interface may transmit the aggregated transaction payload to an external entity for processing. The external entity may be associated with the payee. The external entity may process the transaction identified in the transaction payload. The external entity may transmit a transaction confirmation to the smartglasses. The external entity may also transmit a transaction confirmation to a device associated with each of the cards. The device may be the card itself. The device may be any other suitable device.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
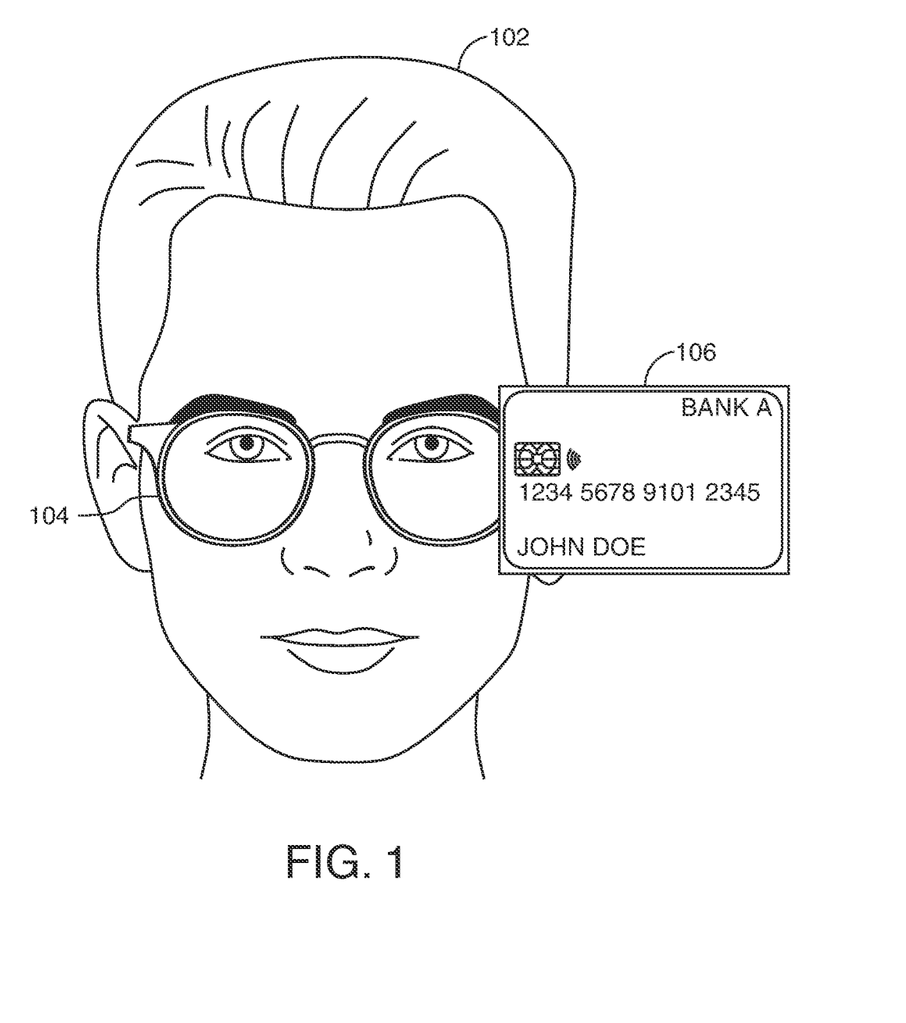
FIG. 1 shows an illustrative diagram in accordance with principles of the disclosure.

FIG. 1 shows an illustrative diagram. User 102 may be wearing smartglasses 104. Smartglasses 104 may include a display. The display may be a nano LED touch screen display. Smartglasses 104 may include a scanning device, such as camera. The camera may capture a photograph of a payment card. The camera may be actuated by receiving an instruction from user 102. The camera may capture a photograph of the face and/or the back of the payment card. The camera may capture a short video clip of the payment card.

In order to initiate a transaction, user 102 may initiate the capture of a photograph of the payment card. As such, smartglasses 104 may operate as a card reader. The captured photograph may be displayed on the display included in the smartglasses, as shown at 106. The captured photograph may be visible to user 102. The captured photograph may not be visible to others in the vicinity.

Figure 2:
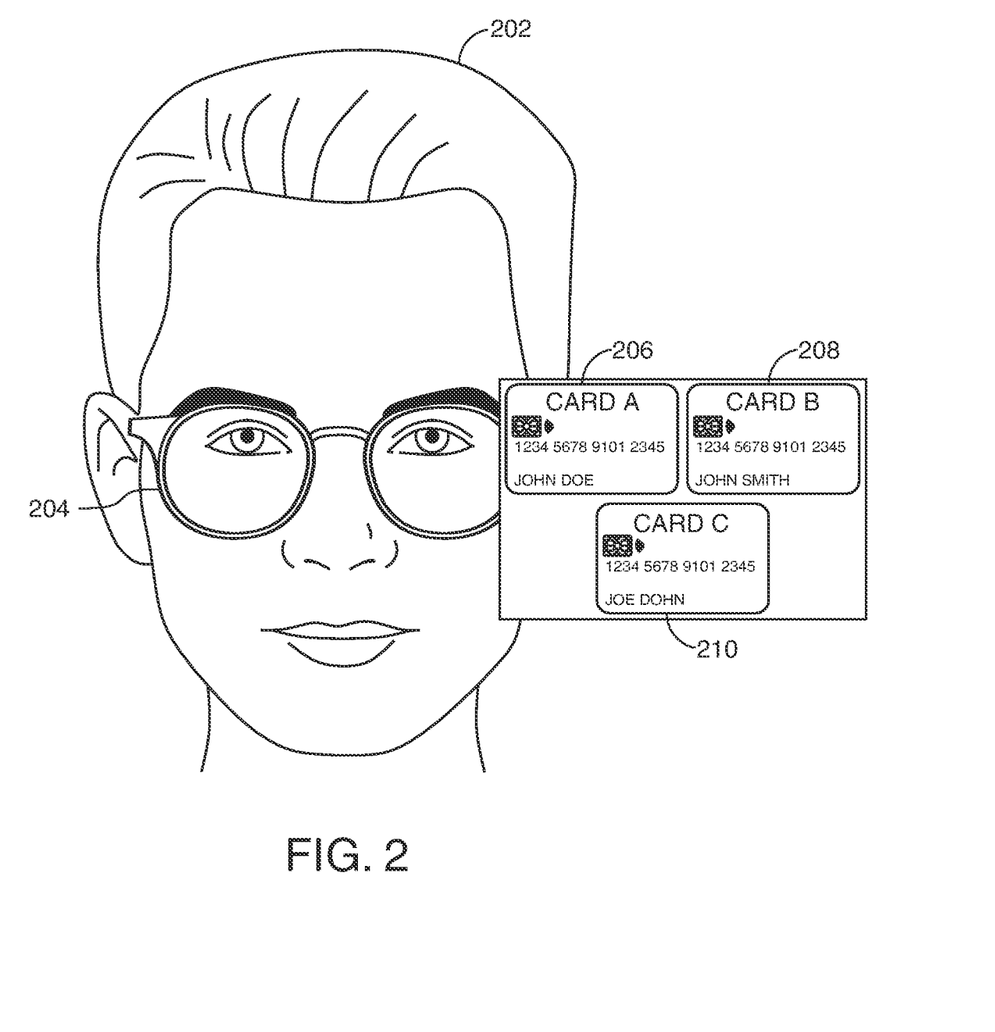
FIG. 2 shows another illustrative diagram in accordance with principles of the disclosure.

FIG. 2 shows another illustrative diagram. User 202 may be wearing smartglasses 204. Smartglasses 204 may include a display. The display may be a nano LED touch screen display. Smartglasses 204 may include a scanning device, such as camera. The camera may capture one or more photographs of multiple payment cards. The camera may be actuated by receiving an instruction from user 202. The camera may capture a photograph of the face and/or the back of the payment cards. The camera may capture a short video clip of the payment cards.

In some embodiments, the smartglasses camera may photograph each individual card separately. The smartglasses may execute a software application to aggregate the individually captured photographs into a single displayable screen. The smartglasses may display the single displayable screen. In certain embodiments, the camera may capture one photograph of multiple payment cards.

User 202 may capture the photograph of the payment cards in order to utilize the payment cards to generate a transaction. Such an embodiment enables multiple cards to be used for a single transaction. This may be useful in the event that multiple payment cards are aggregated to complete a single payment.

As such, smartglasses 204 may operate as a card reader. The captured photographs may be displayed on the display included in the smartglasses, as shown at 206, 208 and 210. The captured photographs may be visible to user 102. The captured photograph may not be visible to others in the vicinity.

Figure 3:
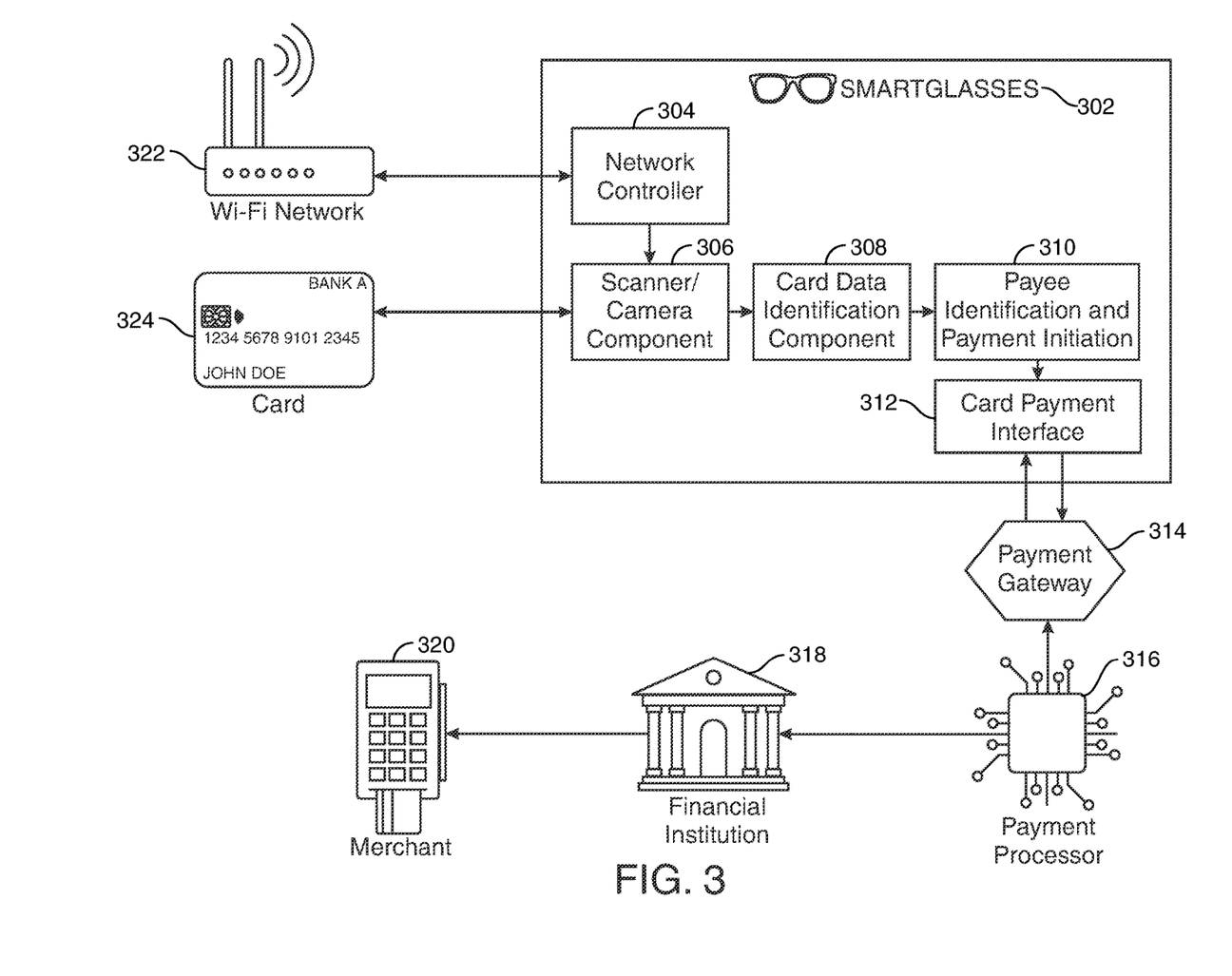
FIG. 3 shows yet another illustrative diagram in accordance with principles of the disclosure.

FIG. 3 shows an illustrative diagram. The illustrative diagram shows a card-to-smartglasses transaction. The card-to-smartglasses transaction may include one card and one smartglasses device.

Smartglasses 302 may include the following components: network controller 304, scanner/camera component 306, card data identification component 308, payee identification and initiation component 310 and card payment interface 312.

Network controller 304 may be a software module that interfaces between external Wi-Fi network 322 and a nano wireless NIC (not shown). As such, network controller 304 may provide wireless connectivity to smartglasses 302.

Scanner/camera component 306 may capture a photograph of payment card 324. Scanner/camera component 306 may transmit the captured photograph to card data identification component 308.

Card data identification component 308 may identify card data elements from the photograph. Such data elements may include a card number, a card holder name, an expiration date, a CVV code and any other suitable data elements. These data elements may be utilized in a payment transaction.

Once the card data elements are identified, payee identification and payment initiation module 310 may be triggered. Payee identification and payment initiation module 310 may identify a payee account for the transaction. The payee account identification may be executed by retrieving payee information from a smartglasses memory. The payee account identification may be executed by communicating a payee alias to a payee financial institution; and receiving payee account information in response to the payee alias communication. The payee account identification may also be executed by receiving payee account details from a payee entity. The payee account identification may be executed by any other suitable method.

Upon payee account identification, card payment interface 312 may communicate with external payment gateway 314. The communication may include transaction details, such as card data elements, payee account information and a transaction amount. Payment gateway 314 may transmit the transaction details to payment processor 316. Payment processor 316 may process the payment and transmit and settle the payment with financial institution 318. Financial institution 318 may transmit the funds to merchant 320, which may be the payee of the transaction.

Figure 4:
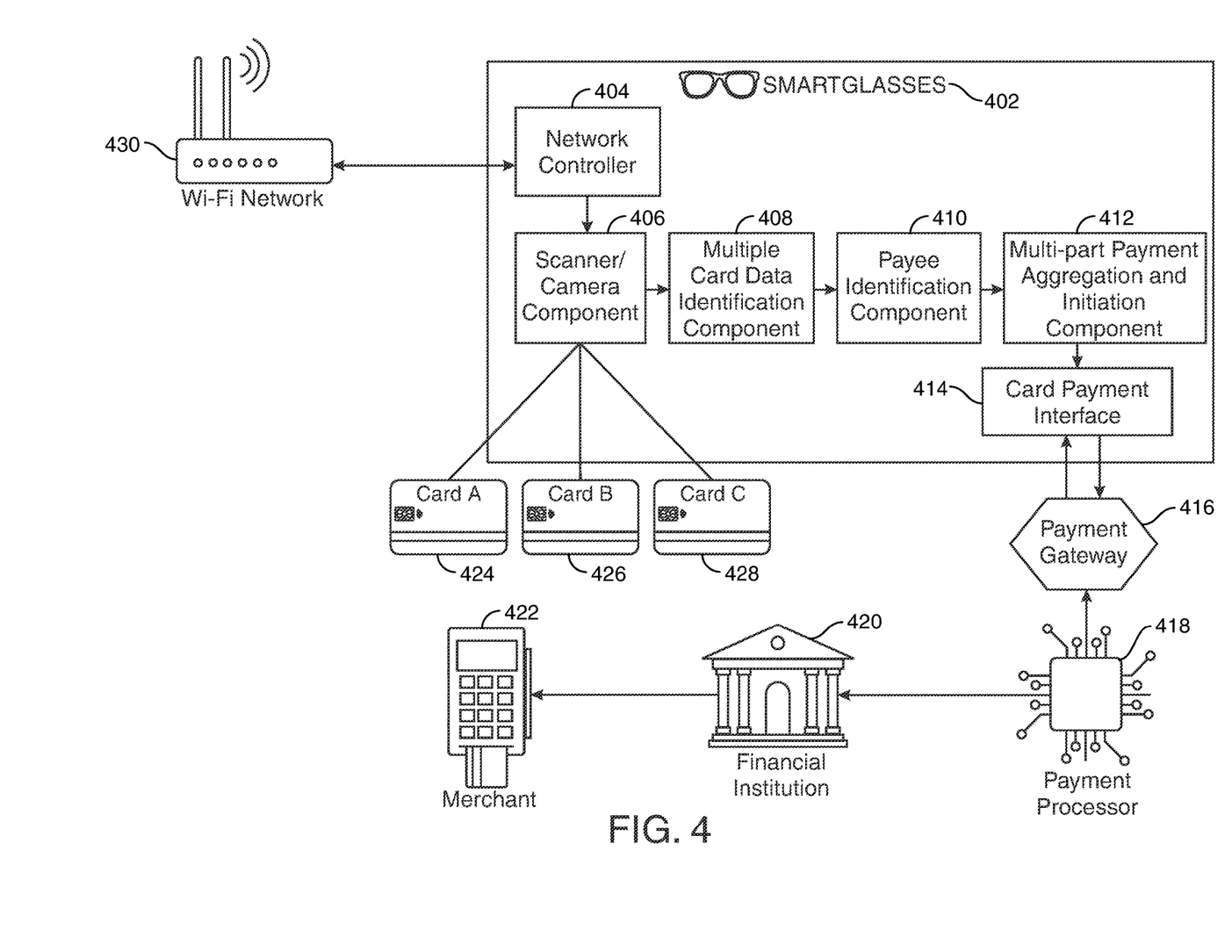
FIG. 4 shows still another illustrative diagram in accordance with principles of the disclosure.

FIG. 4 shows an illustrative diagram. The illustrative diagram shows a multiple-card-to-smartglasses transaction. The multiple-card-to-smartglasses transaction may include more than one card and one smartglasses device.

Smartglasses 402 may include the following components: network controller 404, scanner/camera component 406, multiple card data identification component 408, payee identification component 410, multi-part payment aggregation and initiation component 412 and card payment interface 414.

Network controller 404 may be a software module that interfaces between external Wi-Fi network 430 and a nano wireless NIC (not shown). As such, network controller 404 may provide wireless connectivity to smartglasses 402.

Scanner/camera component 406 may capture a photograph of payment cards 424, 426 and 428. Scanner/camera component 406 may transmit the captured photograph to multiple card data identification component 408.

Multiple card data identification component 408 may identify card data elements from each photograph. Such data elements may include a card number, a card holder name, an expiration date, a CVV code and any other suitable data elements. These data elements may be utilized in a payment transaction.

Once the card data elements for each card are identified, payee identification component 410 may be triggered. Payee identification component 410 may identify a payee account for the transaction. The payee account identification may be executed by retrieving payee information from a smartglasses memory. The payee account identification may be executed by communicating a payee alias to a payee financial institution; and receiving payee account information in response to the communication. The payee account identification may also be executed by receiving payee account details from a payee entity. The payee account identification may be executed by any other suitable method.

Upon payee account identification, multi-part payment aggregation and initiation component 412 may aggregate the card data and initiate the payment transaction.

Card payment interface 414 may communicate with external payment gateway 416. The communication may include transaction details, such as card data elements, payee account information and a transaction amount. Payment gateway 416 may transmit the transaction details to payment processor 418. Payment processor 418 may process the payment and transmit and settle the payment with financial institution 420. Financial institution 420 may transmit the funds to merchant 422, which may be the payee of the transaction.

Figure 5:
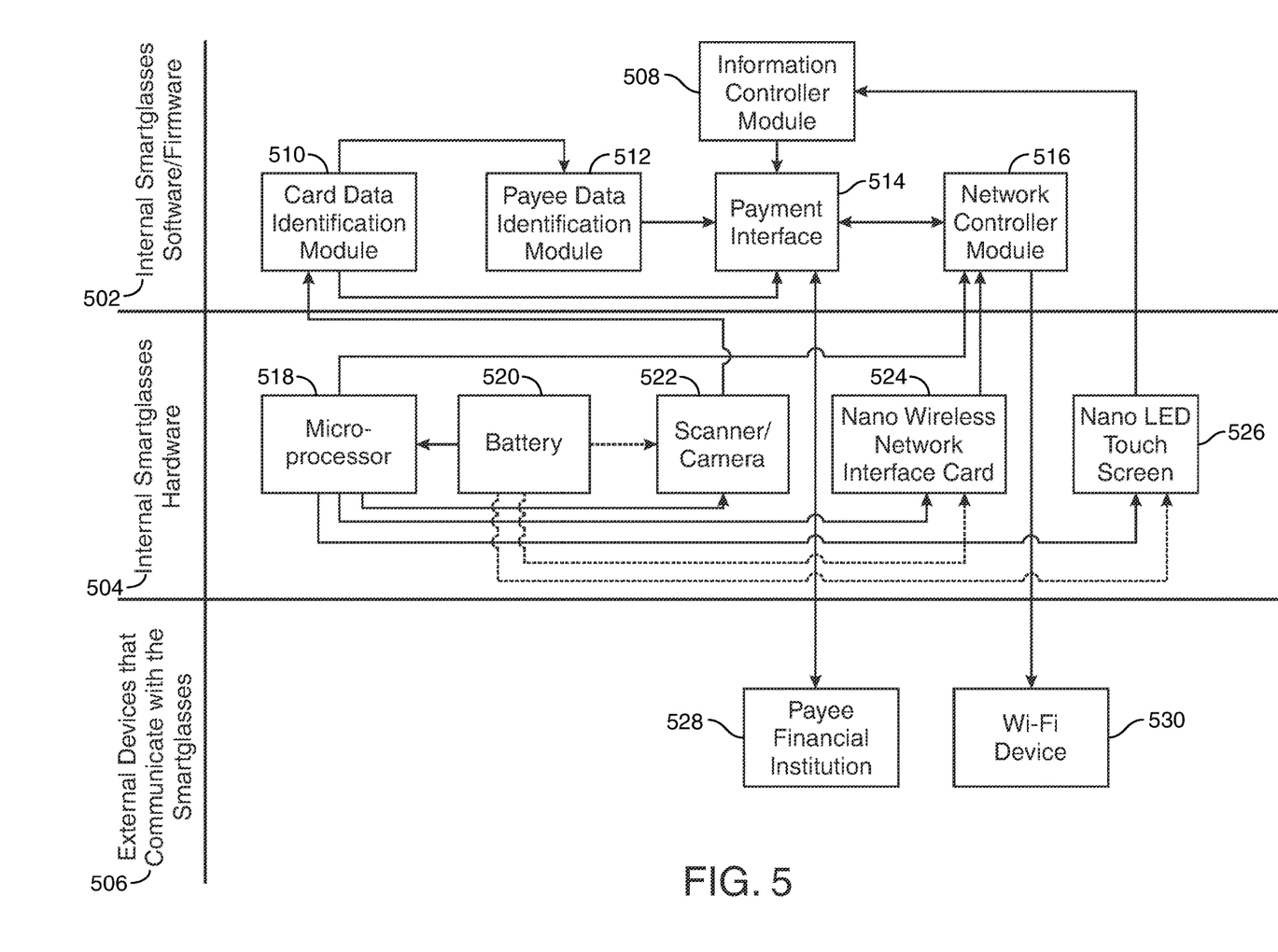
FIG. 5 shows yet another illustrative diagram in accordance with principles of the disclosure.

FIG. 5 shows an illustrative diagram. The illustrative diagram shows a card-to-smartglasses transaction. The card-to-smartglasses transaction may include one card and one smartglasses device.

The illustrative diagram shows three lanes. A first lane, shown at 502, may include internal smartglasses software/firmware. The internal smartglasses software/firmware may include card data identification module 510, payee data identification module 512, payment interface 514, information controller module 508 and network controller module 516.

A second lane, shown at 504, may include internal smartglasses hardware. The internal smartglasses hardware may include microprocessor 518, battery 520, scanner/camera 522, nano wireless network interface card 524 and nano LED touch screen 526.

A third lane, shown at 506, may include external devices that communicate with the smartglasses. The external devices may include payee financial institution 528 and Wi-Fi device 530.

Within the smartglasses, battery 520 may power microprocessor 518. Battery 520 may also power scanner/camera 522, nano wireless network interface card 524 and nano LED touch screen 526.

Microprocessor 518 may provide processor capabilities to scanner/camera 522, nano wireless network interface card 524, nano LED touch screen 526 and network controller module 516.

Scanner/camera 522 may capture a photograph of the card. Scanner/camera 522 may transmit the photograph to card data identification module 510.

Card data identification module 510 may identify card data elements from the photograph. Card data identification module 510 may transmit the card data elements to payment interface 514. Card data identification module 510 may trigger the initiation of payee data identification module 512.

Payee data identification module 512 may identify a payee for a transaction. Payee data identification module 512 may transmit the payee data to payment interface 514.

Nano LED touch screen 526 may capture transaction amount and PIN data from the smartglasses user. Nano LED touch screen 516 may transmit the transaction amount and PIN data to information controller module 508. Information controller module 508 may receive the captured transaction amount and PIN data. Information controller module 508 may reformat the transaction amount and PIN. Information controller 508 may transmit the transaction amount and PIN to payment interface 514.

Network controller module 516 may interface between nano wireless network interface card 514 and Wi-Fi device 530 to provide wireless connectivity to the smartglasses. Network controller 516 may provide wireless connectivity to payment interface 514.

Payment interface 514 may communicate with payee financial institution 528. There may be multiple communications between payment interface 514 and financial institution 528. A first communication may include transmission of a payee alias and a request for a payee account number. Upon receipt of the payee account number, payment interface 514 may aggregate the received data, including card data, payee account number, transaction amount and PIN into an aggregated transaction payload.

A second communication between payment interface 514 and financial institution 518 may include a request for processing of a payment transaction identified in the transaction payload. Upon completion of payment processing, payee financial institution 528 may also transmit a processing completion notification to payment interface 514.

Figure 6:
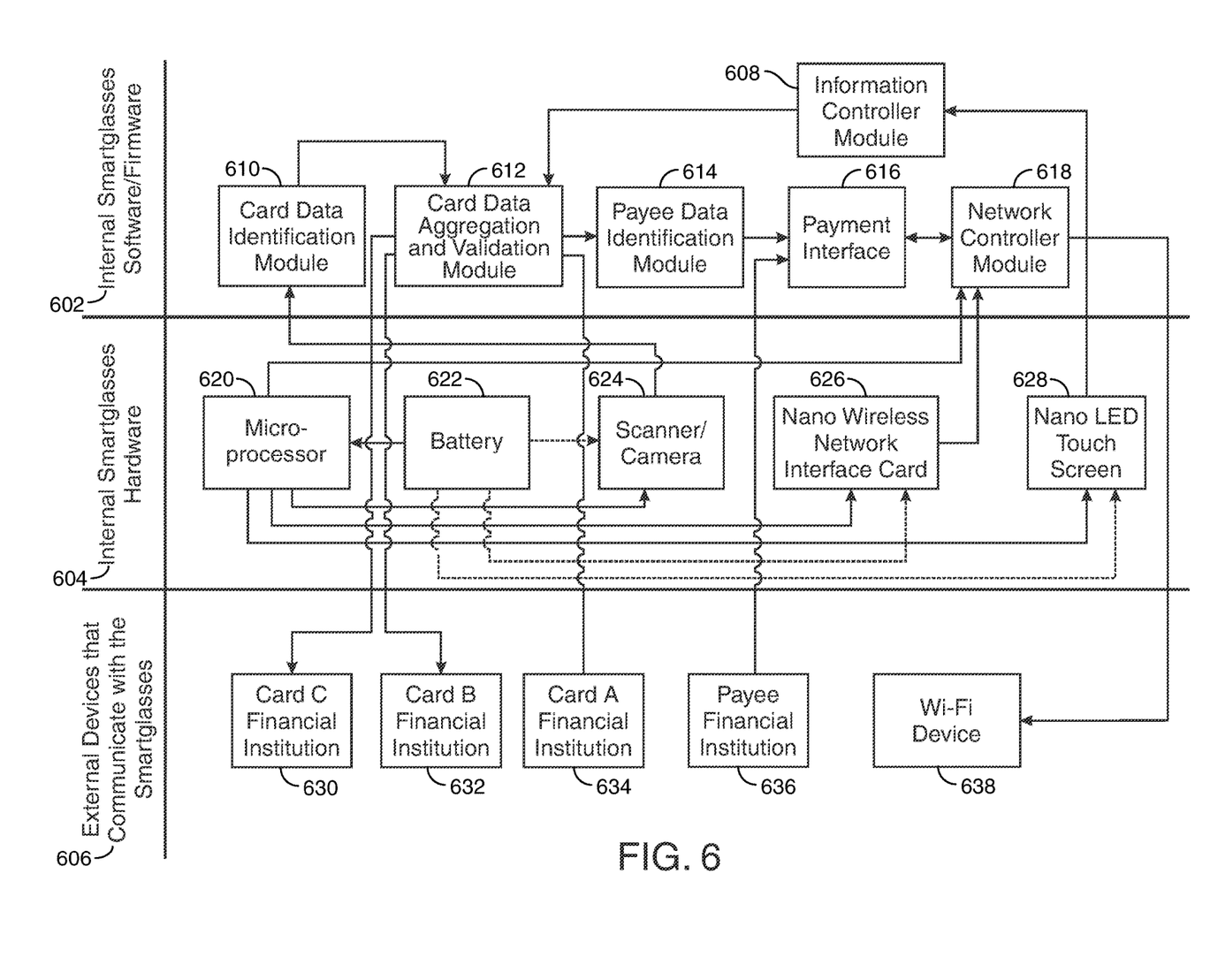
FIG. 6 shows still yet another illustrative diagram in accordance with principles of the disclosure.

FIG. 6 shows an illustrative diagram. The illustrative diagram shows a multiple-card-to-smartglasses transaction. The multiple-card-to-smartglasses transaction may include more than one card and one smartglasses device.

The illustrative diagram shows three lanes. A first lane, shown at 602, may include internal smartglasses software/firmware. The internal smartglasses software/firmware may include card data identification module 610, card data aggregation and validation module 612, payee data identification module 614, payment interface 616, information controller module 608 and network controller module 618.

A second lane, shown at 604, may include internal smartglasses hardware. The internal smartglasses hardware may include microprocessor 620, battery 622, scanner/camera 624, nano wireless network interface card 626 and nano LED touch screen 628.

A third lane, shown at 606, may include external devices that communicate with the smartglasses. The external devices may include card C financial institution 630, card B financial institution 632, card A financial institution 634, payee financial institution 636 and Wi-Fi device 638.

Battery 622 may power microprocessor 620. Battery 622 may also power scanner/camera 624, nano wireless network interface card 626 and nano LED touch screen 628.

Microprocessor 620 may provide processing capabilities to scanner/camera 624, nano wireless network interface card 626, nano LED touch screen 628 and network controller module 618.

Scanner/camera 624 may capture one or more photographs of a plurality of payment cards. The plurality of payment cards may include card A, card B and card C. Scanner/camera 624 may transmit the photographs of card A, card B and card C to card data identification module 610.

Card data identification module 610 may identify card data elements from the photographs of card A, card B and card C. Card data identification module 610 may transmit the card data elements to payment interface card data aggregation and validation module 612.

Nano LED touch screen 628 may capture transaction amount and PIN data from the smartglasses user for card A, card B and card C. Nano LED touch screen 628 may transmit the transaction amount and PIN data to information controller module 608. Information controller module 608 may receive the captured transaction amounts and PIN data. Information controller module 608 may reformat the transaction amounts and PIN data. Information controller 608 may transmit the transaction amounts and PIN data to card data aggregation and validation module 612.

Card data aggregation and validation module 612 may link each transaction amount and PIN to the appropriate card data elements. Card data aggregation and validation module 612 may communicate with each financial institution associated with each card. The financial institution data associated each card may be identified by each card's respective card data elements.

Card data aggregation and validation module 612 may communicate with each financial institution, such as card C financial institution 630, card B financial institution 632 and card A financial institution 634. The communications between card data aggregation and validation module 612 and card C financial institution 630 may validate the transaction amount and PIN for card C. The communications between card data aggregation and validation module 612 and card B financial institution 632 may validate the transaction amount and PIN for card B. The communications between card data aggregation and validation module 612 and card A financial institution 634 may validate the transaction amount and PIN for card A.

Once each transaction amount and PIN is validated for each card, Card data aggregation and validation module 612 may aggregate the card data elements, linked to the transaction amount and PIN, into a single transaction payload.

Upon completion of the card data aggregation, card data aggregation and validation module 612 may trigger the initiation of payee data identification module 614.

Payee data identification module 614 may identify a payee for a transaction. Payee data identification module 614 may retrieve payee data, such as a payee alias, from a nearby merchant point-of-sale system. Payee data identification module 614 may transmit the retrieved payee data to payment interface 616.

Network controller module 618 may interface between nano wireless network interface card 626 and Wi-Fi device 638 to provide wireless connectivity to the smartglasses. Network controller module 618 may provide wireless connectivity to payment interface 616.

Payment interface 616 may communicate with payee financial institution 636. There may be multiple communications between payment interface 616 and financial institution 636. A first communication may include transmission of a payee alias and a request for a payee account number. Once the payee account number is received at payment interface 616, payment interface 616 may aggregate the payee account number to the transaction payload.

A second communication between the payment interface 616 and payee financial 636 may include a request for processing of a payment transaction identified by the transaction payload. The request may include the transaction payload. Payee financial institution 636 may also transmit a processing completion notification to payment interface 616.

Thus, card-to-smartglasses payment systems are provided. Persons skilled in the art will appreciate that the present invention can be practiced by other than the described embodiments, which are presented for purposes of illustration rather than of limitation. The present invention is limited only by the claims that follow.

What is claimed is:

1. A method for card-to-smartglasses communications, said method comprising:
    scanning a plurality of payment cards at a smartglasses device;
    retrieving a plurality of card data elements for each payment card, included in the plurality of payment cards, at a card data identification component within the smartglasses device;
    retrieving a plurality of payee data elements at the smartglasses device;
    receiving a transaction amount and a PIN for each card, included in the plurality of payment cards, at the smartglasses device;
    for each card included in the plurality of payment cards, linking the transaction amount and the PIN to the plurality of card data elements;
    for each card included in the plurality of payment cards, transmitting, via a wireless connectivity enabled on the smartglasses device by a nano wireless network interface card internal to the smartglasses device, the transaction amount and the PIN to an external card entity associated with the card, the external card entity being identified in the plurality of card data elements;

for each card included in the plurality of payment cards, validating, via the wireless connectivity enabled on the smartglasses device by the nano wireless network interface card internal to the smartglasses device, the transaction amount and the PIN with the external card entity;

upon receipt of the validation for each card included in the plurality of payment cards, aggregating, into an aggregated transaction payload, the plurality of card data elements linked to the transaction amount and PIN for each of the plurality of payment cards and the plurality of payee data elements;

initiating a transaction by transmitting, via the wireless connectivity enabled on the smartglasses device by the nano wireless network interface card internal to the smartglasses device, the aggregated transaction payload to an entity;

processing the transaction at the entity; and transmitting a transaction confirmation from the entity to the smartglasses, said transaction confirmation comprising one or more details relating to the transaction.

2. The method of claim 1, wherein the payee data elements comprise an account associated with the smartglasses device.

3. The method of claim 1, wherein the entity is identified within the plurality of card data elements.

4. The method of claim 1, wherein the entity is identified within the plurality of payee data elements.

5. The method of claim 1, further comprising transmitting the transaction confirmation to a device identified within the plurality of card data elements.

6. The method of claim 1, wherein the payee data elements are retrieved from an internal smartglasses memory location.

7. The method of claim 1, wherein the payee data elements are retrieved from the financial institution in response to transmitting a payee telephone number to the financial institution.

8. A smartglasses device comprising:
a plurality of hardware components; and
a plurality of software components;
the plurality of hardware components comprising:
a microprocessor, the microprocessor configured to provide processing capabilities to the plurality of hardware components and the plurality of software components;
a touch screen, the touch screen configured to:
display a plurality of software displays as instructed by the microprocessor; and
receive user input;
a scanner, the scanner is configured to capture a plurality of card photographs, said plurality of card photographs relating to a plurality of payment cards;
a nano wireless network interface card, the nano wireless network interface card configured to establish communication with a wireless network;
a battery, the battery is configured to power the microprocessor, the touch screen, the scanner and the nano wireless network interface card;
the plurality of software components comprising:
a card data identification module, the card data identification module configured to identify a plurality of card data elements from each captured card photograph included in the plurality of cards photographs, each plurality of card data elements relating to a card included in the plurality of payment cards;
an information controller module, the information controller module configured to capture a transaction amount and a personal identification number ("PIN") for each of the plurality of payment cards via the touch screen;
a card data aggregation and validation module, the card data aggregation and validation module configured to:
for each card included in the plurality of payment cards, link the transaction amount and the PIN to the card data elements;
for each card included in the plurality of payment cards, transmit the transaction amount and the PIN to an external card entity associated with the card, the external card entity being identified in the plurality of card data elements;
for each card included in the plurality of payment cards, validate the transaction amount and the PIN with the external card entity;
upon receipt of the validation for each card included in the plurality of payment cards, aggregate, into an aggregated transaction payload, the card data elements linked to the transaction amount and PIN for each of the plurality of payment cards;
a payee data identification module, the payee data identification module configured to identify a plurality of payee data elements, wherein the payee data identification module is instantiated upon conclusion of the card data identification by the card data identification module;
a network controller module, the network controller module is configured to interface between the nano wireless network interface card and an external Wi-Fi device to provide wireless connectivity to the smartglasses device;
a payment interface, the payment interface is configured to:
receive wireless connectivity via the network controller module;
receive processing capabilities from the microprocessor;
receive the aggregated transaction payload;
receive the plurality of payee data elements from the payee data identification module;
communicate the payee data elements to an external entity to request a payee account number;
receive a payee account number from the external entity;
transmit the aggregated transaction payload to the external entity; and
receive a transaction confirmation from the external entity.

9. The smartglasses device of claim 8, wherein the touch screen is a light emitting diode ("LED") touch screen.

10. The smartglasses device of claim 8, wherein the touch screen is an organic light emitting diode ("OLED") touch screen.

11. The smartglasses device of claim 8, wherein the user input is hand-gesture based user input.

12. The smartglasses device of claim 8, wherein the user input is touch-based user input.

13. The smartglasses device of claim 8, wherein the scanner comprises one or more cameras.

14. The smartglasses device of claim 8, wherein the payee data elements comprise a payee telephone number.

15. The smartglasses device of claim 8, wherein the payee data elements comprise a payee e-mail address.

\* \* \* \* \*